US011577845B2

(12) United States Patent
Hardman et al.

(10) Patent No.: US 11,577,845 B2
(45) Date of Patent: *Feb. 14, 2023

(54) COMPOSITE AEROSTRUCTURE WITH INTEGRATED HEATING ELEMENT

(71) Applicant: QARBON AEROSPACE (FOUNDATION), LLC, Red Oak, TX (US)

(72) Inventors: Kyle B. Hardman, Shady Shores, TX (US); Mark A. Calder, Midlothian, TX (US); Ian C. Derx, Rowlett, TX (US)

(73) Assignee: QARBON AEROSPACE (FOUNDATION), LLC, Red Oak, TX (US)

( * ) Notice: Subject to any disclaimer, the term of this patent is extended or adjusted under 35 U.S.C. 154(b) by 566 days.

This patent is subject to a terminal disclaimer.

(21) Appl. No.: 16/564,108

(22) Filed: Sep. 9, 2019

(65) Prior Publication Data
US 2020/0002010 A1    Jan. 2, 2020

Related U.S. Application Data

(62) Division of application No. 16/393,519, filed on Apr. 24, 2019, now Pat. No. 10,457,405.
(Continued)

(51) Int. Cl.
*B64D 15/12* (2006.01)
*B64D 15/22* (2006.01)
(Continued)

(52) U.S. Cl.
CPC ............ *B64D 15/12* (2013.01); *B29C 70/882* (2013.01); *B64D 15/22* (2013.01); *H05B 3/145* (2013.01);
(Continued)

(58) Field of Classification Search
CPC ...... B64D 15/12; B64D 15/22; B29C 70/882; H05B 3/145
(Continued)

(56) References Cited

U.S. PATENT DOCUMENTS 3,768,760 A    10/1973 Jensen
4,177,376 A    12/1979 Horsma et al.
(Continued)

FOREIGN PATENT DOCUMENTS

CN    107386752    11/2017
EP      330722      8/1994
(Continued)

OTHER PUBLICATIONS

International Search and Written Opinion issued in PCT/US19/30611 dated Sep. 4, 2019.
(Continued)

*Primary Examiner* — Christopher P Ellis
(74) *Attorney, Agent, or Firm* — Niels Haun; Dann, Dorfman, Herrell & Skillman, P.C.

(57) ABSTRACT

A heated composite structure and a method for forming a heated composite structure. The structure includes carbon fibers embedded within a thermoplastic matrix. The carbon fibers are connected with first and second electrodes that are configured to be connected with an electric source such that applying current to the electrodes causes current to flow through the embedded carbon fibers to provide resistive heating sufficient to heat the composite structure to impede formation of ice on the composite structure.

13 Claims, 6 Drawing Sheets

Related U.S. Application Data

(60) Provisional application No. 62/661,917, filed on Apr. 24, 2018.

(51) Int. Cl.
| | |
|---|---|
| *B29C 70/88* | (2006.01) |
| *H05B 3/28* | (2006.01) |
| *H05B 3/14* | (2006.01) |
| *B29K 307/04* | (2006.01) |
| *B29K 105/10* | (2006.01) |
| *B29K 71/00* | (2006.01) |
| *B29L 31/30* | (2006.01) |

(52) U.S. Cl.
CPC .......... *H05B 3/286* (2013.01); *B29K 2071/00* (2013.01); *B29K 2105/101* (2013.01); *B29K 2307/04* (2013.01); *B29K 2995/0005* (2013.01); *B29L 2031/3076* (2013.01); *H05B 2203/003* (2013.01)

(58) Field of Classification Search
USPC ......................................... 244/133 D, 134 D
See application file for complete search history.

(56) References Cited

U.S. PATENT DOCUMENTS

| | | | |
|---|---|---|---|
| 4,871,412 | A | 10/1989 | Felix et al. |
| 4,957,577 | A | 9/1990 | Huebner |
| 4,957,805 | A | 9/1990 | Biggs |
| 4,990,213 | A | 2/1991 | Brown |
| 5,059,377 | A | 10/1991 | Ashton |
| 5,240,542 | A | 8/1993 | Miller |
| 5,359,911 | A | 11/1994 | Kruesi |
| 5,421,935 | A | 6/1995 | Dixon et al. |
| 5,662,293 | A | 9/1997 | Hower |
| 5,700,347 | A | 12/1997 | McCowin |
| 5,934,617 | A | 8/1999 | Rutherford |
| 6,031,214 | A | 2/2000 | Bost |
| 6,194,685 | B1 | 2/2001 | Rutherford |
| 6,237,874 | B1 | 5/2001 | Rutherford et al. |
| 6,279,856 | B1 | 8/2001 | Rutherford et al. |
| 6,284,347 | B1 | 9/2001 | Green et al. |
| 6,330,986 | B1 | 12/2001 | Rutherford et al. |
| 6,565,942 | B2 | 5/2003 | Anderson et al. |
| 7,243,055 | B2 | 7/2007 | Chen |
| 7,585,156 | B2 | 9/2009 | Oldroyd |
| 8,097,104 | B2 | 1/2012 | Lengsfeld |
| 9,227,732 | B2 | 1/2016 | Stonestreet, II et al. |
| 9,840,043 | B2 | 12/2017 | Schulte et al. |
| 10,449,749 | B1 | 10/2019 | Calder |
| 10,457,405 | B1* | 10/2019 | Hardman .............. B64D 15/12 |
| 2002/0168184 | A1 | 11/2002 | Meisiek |
| 2003/0145932 | A1 | 8/2003 | Holmes |
| 2007/0298663 | A1 | 12/2007 | Marshall et al. |
| 2010/0308173 | A1 | 12/2010 | Atkinson |
| 2011/0097575 | A1 | 4/2011 | Pratte |
| 2011/0135899 | A1 | 6/2011 | Meltzer |
| 2011/0168324 | A1 | 7/2011 | Ender |
| 2012/0298804 | A1 | 11/2012 | Lewis |
| 2013/0001211 | A1 | 1/2013 | Lewis |
| 2013/0034684 | A1 | 2/2013 | Meyer |
| 2014/0070054 | A1 | 3/2014 | Burton et al. |
| 2014/0151353 | A1* | 6/2014 | Steinwandel .......... B64D 15/12 219/202 |
| 2014/0263838 | A1* | 9/2014 | Snir ...................... B64D 15/22 244/134 F |
| 2015/0184333 | A1 | 7/2015 | Arai et al. |
| 2015/0210400 | A1* | 7/2015 | Gonidec ................ B64D 15/12 415/178 |
| 2015/0344138 | A1* | 12/2015 | Wen .......................... B64C 1/12 219/544 |
| 2015/0377128 | A1* | 12/2015 | Copiello .................. F02C 7/045 415/119 |
| 2016/0076552 | A1 | 3/2016 | Anderson |
| 2016/0226042 | A1* | 8/2016 | Hartmann .............. H01M 50/24 |
| 2016/0236406 | A1 | 8/2016 | Schulte et al. |
| 2017/0238367 | A1 | 8/2017 | Sellinger |
| 2019/0322375 | A1* | 10/2019 | Hardman .............. B32B 27/288 |
| 2020/0001569 | A1 | 1/2020 | Calder |

FOREIGN PATENT DOCUMENTS

| | | |
|---|---|---|
| EP | 1200308 | 4/2004 |
| EP | 2910365 | 8/2015 |
| GB | 2513652 | 11/2014 |
| WO | 9640551 | 12/1996 |
| WO | 2011087412 | 7/2011 |

OTHER PUBLICATIONS

Gillespie et al., Advanced Material Intelligent Processing Center: Next Generation Scalable Lean Manufacturing, 96 pages, Sep. 4, 2012, Office of Naval Research Grant Grant No. NOOOI40911011, URL: https://apps.dtic.mil/sti/pdfs/ADA564963.pdf.

Shevchenko et al., Rapid Automated Induction Lamination (RAIL) for High-Volume Production of Carbon/Thermoplastic Laminates, 48 pages, May 2001, Army Research Laboratory Report,URL: https://apps.dtic.mil/dtic/tr/fulltext/u2/a390864.pdf.

Goldstein, Magnetic Flux Controllers in Induction Heating and Melting, 13 pages, 2014, ASM Handbook, vol. 4C, Induction Heating and Heat Treatment, URL: https://fluxtrol.com/inc/pdf/Magnetic-Flux-Controllers.pdf.

Third-Party Submission Under 37 CFR 1.290 submitted in U.S. Appl. No. 16/414,737;by John L. Welsh on Feb. 26, 2021.

Concise Description of Relevance of Gillespie to Claims 1-27 of U.S. 2()19/0351647 submitted with the Third-Party Submission Under 37 CFR 1.290 submitted in U.S. Appl. No. 16/414,737;by John L. Welsh on Feb. 26, 2021.

International Search Report issued in International Application No. PCT/US19/32748 dated Sep. 17, 2019.

Development of the Gulfstream G650 Induction Welded Thermoplastic Elevators and Rudder; van Ingen et al.; https://wvww.researchgate.net/publication/332403057_ Development_of_the_Gulfstream_G650 _induction_ welded_thermopiastic _elevators_ and_ rudder; May 2010.

Worrall et al., Novel Induction Heating Technique for Joining of Carbon Fibre Compositions, pp. 1-6, ECCM 16 __16th European Conference on Composite Materials, Seville, Spain, Jun. 22-26, 2014, http://www.escm.eu.mg/eccm16/assets/0544.pdf.

A new laminates encoding scheme for the genetic algorithm-based optimization of stiffened composite panels; Chemiaev, Aleksandr; https://www.researchgate.net/publication/263268416 _A_new_ laminates_ encoding _scheme _for_the _genetic_algorithm-based_ optimization_of_stiffened_ composite _panels; Feb. 2014.

Concise Description of Relevance of Submitted Art for Claims 1-22 of U.S. Appl. No. 16/557,107.

Third Party Submission in Published U.S. Appl. No. 16/557,107.

Worrall et al., A New Approach to Improved Control of Thermoplastic Composites Induction Welding, Poster, Presented ICCM 19 conference Jul. 28-Aug. 2, 2013, http://www.iccm-central.org/Proceedinqs/ICCM19p,oceedings/papers/WOR81566.ptif.

International Search Report issued in PCT Application No. PCT/US19/28978 dated Jul. 30, 2019.

"Electro-thermal Laminar Wing Ice Protection System Demonstrator" webpage, https://cordis.europa.eu/project/rcn/105959/reporting/fr, Jul. 26, 2017, 5 pages.

Worrall et al, "Novel Induction Heating Technique for Joining of Carbon Fibre Composites" paper presented at SEICO 14: 35th International Technical Conference & Forum "Low Cost Composite Processing, from Aerospace OOA to Automotive Thermoplastic", 2014 6 pages.

Silvio Pappada, "Eco-Design and Manufacturing of Thermoplastic Structural Fairing for Helicopters" CETMA conference 2014, 25 pages.

(56) References Cited

OTHER PUBLICATIONS

"Smart wings offer a composite solution to the threat posed by icing in flight" webpage, https://amrc.co.uk/news/smart-wings-offer-a-composite-solution-to-the-threat-posed-by-icing-in-flight, Mar. 30, 2017, 5 pages.
Request for Ex Parte Reexamination of U.S. Pat. No. 10,449,749; John L. Welsh, Welsh Flaxman & Gitler LLC; Apr. 7, 2022.

\* cited by examiner

COMPOSITE AEROSTRUCTURE WITH INTEGRATED HEATING ELEMENT

PRIORITY CLAIM

This application is a divisional application of co-pending U.S. patent application Ser. No. 16/393,519 filed on Apr. 24, 2019 which claims priority to U.S. Provisional Patent Application No. 62/661,917 filed on Apr. 24, 2018. The entire disclosure of each of the foregoing applications is hereby incorporated herein by reference.

FIELD OF THE INVENTION

The present invention relates to the field of composite materials. In particular, the present application relates to composite materials that incorporate an integrated heating assembly. The present invention finds particular application to the field of ice protection systems for composite aerostructures.

BACKGROUND

Ice build-up on aircraft surfaces can cause dangerous in flight situations and has led to numerous fatalities over the years. On structures such as the airframe, airfoils, wings, etc. icing leads to increased weight, increased drag and decreased lift. On structures such as engine intakes, icing on the leading edge can create flow problems and lead to ice ingestion, which can degrade operation of the engine or damage components of the engine.

To prevent the dangers associated with icing, numerous ice protection systems have been developed over the years to protect the aircraft from icing and/or to shed ice from the surfaces if ice accumulates. The primary ice protection system in use today are bleed air systems that re-directs a portion of the compressed air from the engine before the air enters the combustion chamber. The compressed air is pressurized hot air that is used to heat up surfaces of the aircraft to prevent the build-up of ice. Although bleed air systems are effective, they reduce the efficiency of the engines and increase the weight of the aircraft. Accordingly, there has been a long felt need for an ice protection system that does not suffer from the drawbacks of the known systems.

SUMMARY OF THE INVENTION

In light of the foregoing, according to an aspect of the present invention, a heated aerostructure is provided. The heated aerostructure includes a composite structure that comprises a carbon fiber reinforced thermoplastic upper layer, a carbon fiber reinforced thermoplastic lower layer and a carbon fiber reinforced thermoplastic heater layer. The heater layer includes a plurality of electrically conductive carbon fibers, a first electrode electrically connected with the conductive carbon fibers, and a second electrode electrically connected with the conductive carbon fibers. The conductive carbon fibers provide an electrical pathway between the first electrode and the second electrode. The aerostructure also includes a controller connected with an electrical power source for controlling the power provided to the first electrode. The first electrode and the electrically conductive carbon fibers are connected such that electric power applied to the first electrode is conducted to the electrically conductive carbon fibers to provide resistive heating sufficient to heat the composite structure to impede formation of ice on the composite structure.

According to a further aspect, the present invention provides a heated aerostructure having a controller that is operable to control the electrical power provided to the first electrode in response to signals received from a sensor that detects a characteristic indicative of the presence of ice on the aerostructure.

Still further, the present invention provides a heated aerostructure having an upper layer comprises a semicrystalline thermoplastic in the polyaryletherketone family. Similarly, the present invention provides a heated aerostructure having a lower layer that comprises a semicrystalline thermoplastic in the polyaryletherketone family.

Further yet, the present invention provides a heated aerostructure wherein the heater layer and at least one of an upper layer and a lower layer comprise similar thermoplastic.

According to a further aspect, the present invention provides a heated aerostructure having a heater layer, an upper layer and a lower layer that comprise a semicrystalline thermoplastic in the polyaryletherketone family.

According to yet another aspect, the present invention provides a heated aerostructure comprising a first electrically insulative layer insulating an upper layer from the heater layer. Similarly, the present invention also provides a heated aerostructure comprising a second electrically insulative layer insulating the lower layer from the heater layer. Optionally, one or both of the first and second electrically insulative layers may comprise thermoplastic. Further, optionally, the first electrically insulative layer comprises a composite material comprising reinforcing fibers embedded within the thermoplastic.

According to still another aspect, the present invention provides a heated aerostructure that includes a first electrode that comprises a metallic mesh embedded within a thermoplastic of a heater layer.

According to another aspect, the present invention provides a heated aerostructure comprising a composite structure that forms a portion of an airfoil.

According to a further aspect, the present invention provides a heated aerostructure comprising a composite structure that forms a portion of a nacelle.

According to yet another aspect, the present invention provides a heated aerostructure having an upper layer comprising a plurality of carbon fiber reinforced thermoplastic lamina. Similarly, the present invention provides a heated aerostructure that may have a lower layer comprises a plurality of carbon fiber reinforced thermoplastic lamina. Optionally, the thermoplastic of each of the heater layer, the upper layer and the lower layer are fused with the thermoplastic in adjacent layers.

According to another aspect, the present invention provides a heated aerostructure that includes a composite structure formed of a reinforced thermoplastic upper layer, a reinforced thermoplastic lower layer, and a reinforced thermoplastic heater layer. The heater layer includes a plurality of electrically conductive non-metallic fibers, a first electrode electrically connected with the conductive non-metallic fibers, and a second electrode electrically connected with the conductive non-metallic fibers, so that the conductive non-metallic fibers provide an electrical pathway between the first electrode and the second electrode. A sensor detects a characteristic indicative of ice formation on the composite structure and a controller connected with the sensor and an electrical power source controls the power provided to the first electrode. The first electrode and the conductive non-metallic fibers are connected such that electric power applied to the first electrode is conducted to the electrically conductive non-metallic fibers to provide resistive heating sufficient to heat the composite structure to impede formation of ice on the composite structure.

According to yet another aspect, the present invention provides a heated composite structure that includes a carbon fiber reinforced thermoplastic upper layer, a carbon fiber reinforced thermoplastic lower layer, and a carbon fiber reinforced thermoplastic heater layer. The heater layer may include a plurality of electrically conductive carbon fibers, a first electrode electrically connected with the conductive carbon fibers, and a second electrode electrically connected with the conductive carbon fibers, so that the conductive carbon fibers provide an electrical pathway between the first electrode and the second electrode. The first electrode and the electrically conductive carbon fibers are connected such that electric power applied to the first electrode is conducted to the electrically conductive carbon fibers to provide resistive heating sufficient for the heating layer to achieve a temperature increase of at least 50 degrees Fahrenheit or approximately 30 degrees Celsius. Optionally, the carbon fibers of the heater layer are connected with the first electrode such that electric power applied to the first electrode is conducted to the electrically conductive carbon fibers to provide resistive heating sufficient for the heating layer to achieve a temperature increase of 100 degrees Fahrenheit or approximately 55 degrees Celsius. Further still, the carbon fibers of the heater layer may be connected with the first electrode such that electric power applied to the first electrode is conducted to the electrically conductive carbon fibers to provide resistive heating sufficient for the heating layer to achieve a temperature increase of 200 degrees Fahrenheit or approximately 110 degrees Celsius.

According to another aspect, the present invention provides a method for forming a heated composite structure. The method includes the steps of providing a plurality of carbon fibers embedded within a thermoplastic matrix and electrically connecting the carbon fibers with first and second electrodes to form a heater layer. The method further includes the steps of heating the heating layer above the melting temperature of the thermoplastic matrix and heating a plurality of layers of reinforced thermoplastic laminae. The thermoplastic in the laminae have a melting temperature and the step of heating the plurality of layers comprises heating the layers above the melting temperature of the thermoplastic in the laminae. Additionally, the method includes the step of applying the heated plurality of layers to the heated heating layer so that the heater is fused with the plurality of layers after the heater layer and the plurality of layers cool.

According to yet another aspect, the present invention provides a method of heating a composite structure. The method includes the step of providing a composite structure formed of a carbon fiber reinforced thermoplastic layer, wherein the carbon fibers are connected with first and second electrodes. The first and second electrodes are connected to an electric source and the flow of electricity from the electric source to the first electrode is controlled so that the electricity flows from the first electrode to the carbon fibers to the second electrode to provide resistive heating sufficient to heat the composite structure.

According to a further aspect, the present invention provides a method of heating a composite structure wherein the step of controlling comprises controlling the flow of electricity to provide resistive heating sufficient to heat the composite structure to impede formation of ice on the composite structure.

According to still another aspect, the present invention provides a method that include the step of monitoring the temperature of the composite structure and a step of controlling comprises controlling the flow of electricity in response to the step of monitoring.

According to yet another aspect, the present invention provides a heated composite structure that includes a carbon fiber reinforced thermoplastic upper layer, a carbon fiber reinforced thermoplastic lower layer, and a carbon fiber reinforced thermoplastic heater layer. The upper layer, lower layer and heater layer are consolidated to form a laminate. The heater layer comprises a plurality of electrically conductive carbon fibers and the heater layer is configured so that the electrically conductive carbon fibers of the heater layer are connectable with a power source so that electricity can flow through the electrically conductive carbon fibers of the heater layer to provide resistive heating sufficient for the heating layer to heat at least a portion of the laminate at least approximately 50 degrees Fahrenheit or 30 degrees Celsius. Optionally, the structure includes a sensor operable to sense a characteristic indicative of ice forming on an outer surface of the laminate. Additionally, the structure may optionally include a controller connected with the sensor and an electrical power source for controlling the power provided to the heater layer. Still further, the structure may optionally include first and second electrodes embedded within the laminate in electrical contract with the electrically conductive carbon fibers such that electric power applied to the first electrode is conducted to the electrically conductive carbon fibers to provide resistive heating sufficient to heat the composite structure to impede formation of ice on the composite structure. Additionally, the controller may be operable to control the electrical power provided to heater layer in response to signals received from the sensor.

While the methods and apparatus are described herein by way of example for several embodiments and illustrative drawings, those skilled in the art will recognize that the inventive aerostructure with integrated heating element and method for making such an aerostructure are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the methods and apparatus for sorting items using one or more dynamically reconfigurable sorting array defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
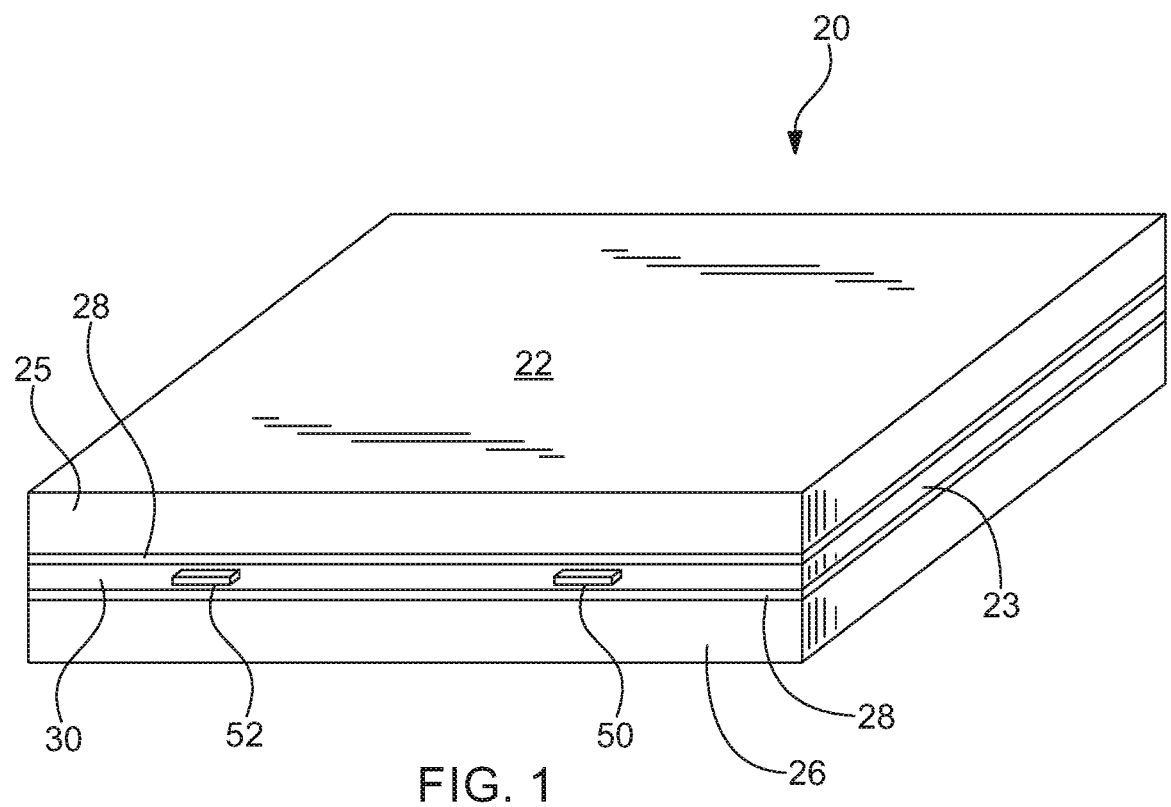
FIG. 1 is a diagrammatic perspective view of a composite structure with an integrated heating assembly.
Figure 2:
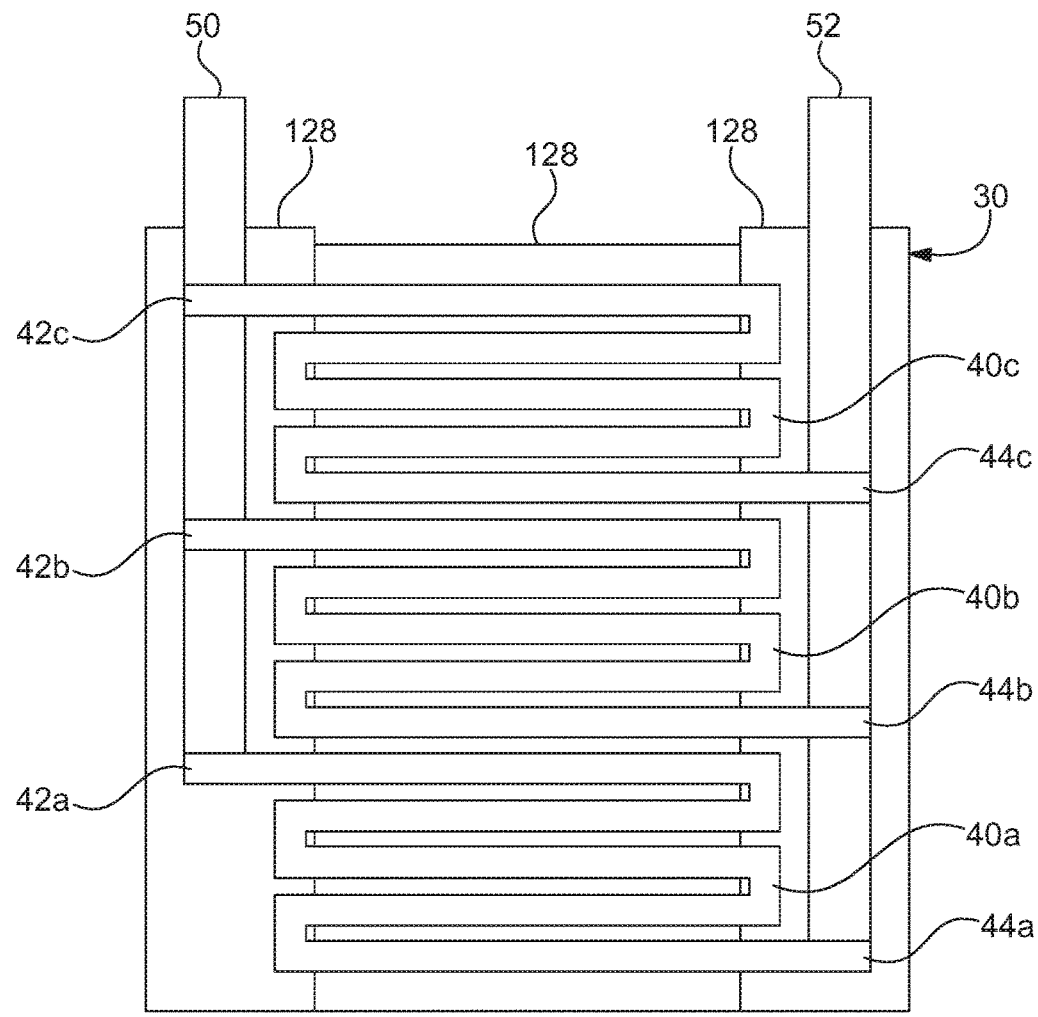
FIG. 2 is a plan view of the heating assembly of the composite structure illustrated in FIG. 1.
Figure 3:
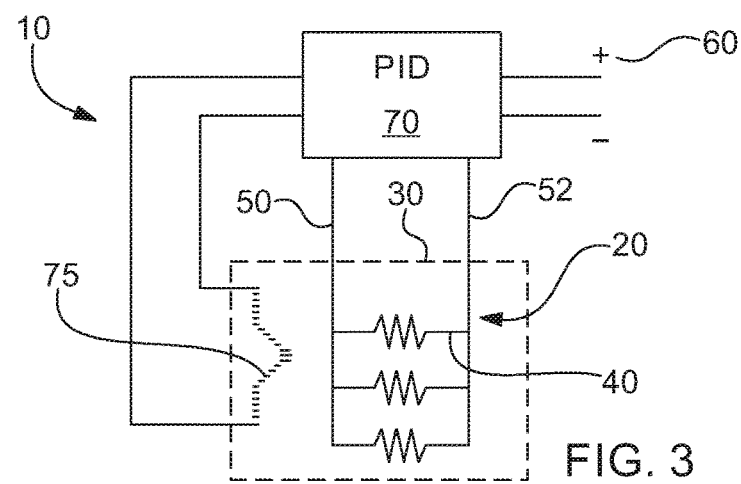
FIG. 3. is a diagrammatic view of a system incorporating the composite structure illustrated in FIG. 1.

Referring now to the figures in general, and to FIGS. 1-3 in particular, a system that incorporates a composite structure with an integrated heating assembly is designated generally 10. The system includes a laminate 20, a power source 60 and a controller 70 that controls the power provided to the laminate. The laminate includes structural layers 25, 26 and a heating assembly 30. The heating layer 30 may be configured to provide sufficient heat to the structure to heat the upper and/or lower surface of the laminate 20.

Referring now to FIG. 1, the details of the laminate 20 will be described in greater detail. The laminate 20 includes a heating element 30 embedded within structural layers. In particular, the heating element 30 is sandwiched between an upper structural layer 25 and a lower structural layer 26. The upper and lower structural layers 25, 26 are each formed of one or more plies of a composite lamina. In the present instance, each structural layer comprises a plurality of composite laminae. Each composite lamina comprises reinforcing elements embedded within a matrix material. Depending upon the application, the reinforcing elements may be any of a variety of reinforcing materials. By way of example, the reinforcing elements may be elongated strands or fibers of glass or carbon. For instance, an exemplary carbon fiber is a continuous, high strength, high strain, PAN based fiber in tows of 3,000 to 12,000. In particular, in the present instance, the reinforcing elements are carbon fibers produced by Hexcel Corporation of Stamford, Conn. and sold under the name HEXTOW, such as HEXTOW AS4D. These reinforcing fibers may be treated with a surface treatment and may be sized to improve their interlaminar shear properties with the matrix material. However, it should be understood that these materials are intended as exemplary materials; other materials can be utilized depending on the environment in which the laminate is to be used.

The reinforcing elements are embedded within a matrix material, such as a polymer. Depending on the application, any of a variety of polymers can be used for the matrix material, including amorphous, crystalline and semi-crystalline polymers. In the present instance, the matrix material is a thermoplastic material, such as a thermoplastic elastomer. More specifically, the thermoplastic material is a semi-crystalline thermoplastic. In particular, the thermoplastic may be a thermoplastic polymer in the polyaryletherketone (PAEK) family, including, but not limited to polyetheretherketone (PEEK) and polyetherketoneketone (PEKK).

As noted above, the structural layers 25, 26 are formed of one or more composite laminae, which may be carbon fiber reinforced thermoplastic composites. In particular, the lamina may be thermoplastic prepregs, which are laminae in which the reinforcement materials have been pre-impregnated with resin. For instance, the prepreg may be thermoplastic prepregs produced by coating fiber reinforcement with a thermoplastic matrix. Such a prepreg lamina has the ability to be reheated and reformed by heating the lamina above the melting point of the thermoplastic matrix. Several exemplary prepreg materials that may be used to form the structural elements 25, 26 include, but are not limited to, materials produced by TenCate Advanced Composites USA of Morgan Hill, Calif. and sold under the name CETEX, such as TC1200, TC1225 and TC1320. TC1200 is a carbon fiber reinforced semi-crystalline PEEK composite having a glass transition temperature ($T_g$) of 143° C./289° F. and a melting temperature ($T_m$) of 343° C./649° F. TC1225 is a carbon fiber reinforced semi-crystalline PAEK composite having a $T_g$ of 147° C./297° F. and a $T_m$ of 305° C./581° F. TC1320 is a carbon fiber reinforced semi-crystalline PEKK composite having a $T_g$ of 150° C./318° F. and a $T_m$ of 337° C./639° F.

Referring again to FIG. 1, the laminate comprises a heating layer 30 disposed between the upper and lower structural layers 25, 26. The structural layers are formed of composite lamina and are configured to carry the structural load. Although the heating layer may be configured to carry structural load, in the present instance, the heater layer 30 is configured to heat the laminate 20 without carrying significant, if any, structural load. In particular, the heating layer 30 is configured to provide sufficient heat to raise the temperature of the upper surface 22 and/or the lower surface 23 of the laminate.

The heating layer 30 is configured to provide resistive heating by passing current through one or more resistive elements 40, which operate as the heating element. The resistive elements 40 are electrically conductive, but provide sufficient electrical resistance to provide resistive heating when current is applied. A variety of resistive elements may be incorporated into the heating layer 30, however, in the present instance, the resistive elements are formed of a non-metallic element. Further still, the heating element may be the same or substantially similar to the reinforcing elements in one or both of the structural layers 25, 26. For instance, in the present instance, the resistive elements 40 are carbon fibers. Specifically, the resistive elements 40 are carbon fibers, such as the continuous, high strength, high strain, PAN based fibers described above in connection with the structural layers 25, 26.

Referring to FIGS. 1-2, the resistive elements 40 are connected with an input electrode 50 and an output electrode 52. The resistive elements 40 provide a continuous path between the first and second electrodes 50, 52. The resistive elements 40 are oriented in the laminate 20 to heat at least a portion of the laminate along the length of the laminate. In the present instance, the resistive elements 40 are carbon fibers and the fibers are oriented to form a serpentine pattern through the length of the laminate. Although each resistive element may extend the length and/or width of the laminate, in the present instance, the resistive elements extend a portion of the length of the laminate. For instance, a first resistive element 40a has a first end 42a connected with the first electrode 50 and a second end 44a connected with the second electrode 52. Similarly, additional resistive elements 40b, 40c extend between electrodes 50, 52.

In the foregoing description, each resistive element 40a, 40b, 40c is described as an individual element, however, it should be understood that each resistive element may comprise a plurality of separate resistive elements. In particular, when the resistive elements are carbon fibers, each resistive element may comprise hundreds or thousands of individual strands or fibers that extend along the length of the resistive element.

The carbon fiber resistive elements 40 are embedded within a matrix material. Preferably, the matrix material is a thermoplastic material that can be heat fused with the other layers in the laminate. By heat fusing the matrix material of the heating layer, the heating layer is integrally formed with the laminate. In particular, in the present instance, the heating assembly is formed of a composite material that is substantially similar to the composite material forming the structural layers 25, 26. For instance, the resistive elements are carbon fibers and the matrix material is a thermoplastic material, such as a semi-crystalline thermoplastic in the polyaryletherketone (PAEK) family. Additionally, in the present instance, the resistive elements are formed from a lamina of unidirectional carbon fiber material. The unidirectional fibers are formed into a plurality of segments that are interconnected to form continuous resistive elements from the first end 42 to the second end 44. In the present instance, the individual segments of each resistive element are interconnected by conductive elements, such as copper. Additionally, although the present embodiment incorporates unidirectional fibers, it should be understood that the resistive element may be formed of a plurality of continuous strands or fibers of conductive material. For instance, the resistive element may comprise a plurality of continuous carbon fibers in which the carbon fibers are not straight, but instead form curved elements, similar to the serpentine pattern shown in FIG. 2. For example, the carbon fibers may be formed in a wavy composite in which the fibers are laid out in a periodic wave pattern, similar to a sine wave.

If the resistive elements 40 are carbon fibers, the carbon fibers may be coated with a sizing material to improve the bonding between the carbon fibers and the matrix material. However, the sizing material may tend to electrically insulate the carbon fibers from making electrical connection with the electrodes 50, 52. Accordingly, it may be desirable to utilize a conductive element that increases the potential number of points of electrical connection between the carbon fibers and the electrodes. Additionally, it may be desirable to utilize a conductive element that may be more likely to contact the ends of the carbon fibers that are not covered in sizing. For instance, in the present instance, the electrodes 50, 52 comprise a conductive metal mesh, such as copper mesh. The metal mesh provides multiple points of contact along the length of the end of each resistive element 40. The configuration of the copper mesh may vary, however, preferably the mesh is configured so that the open portion of the mesh (the area of pores per square inch of mesh) is greater than the closed portion of the mesh (i.e. the area of the copper per square inch of mesh). Additionally, the open portion of the mesh may be greater than approximately 60%. In some configurations, the open portion of the mesh may be greater than approximately 70%.

As described above, the heating layer 30 comprises a plurality of carbon fibers electrically connected with conductive elements, such as the input electrode 50 and the output electrode 52. The carbon fibers are embedded within a matrix material, such as a thermoplastic. Similarly, the structural layers 25, 26 may also be formed of carbon fiber reinforced thermoplastic material. Therefore, the carbon fibers in the structural elements are also electrical conductive. To ensure that the elements of the heating layer 30 do not electrically connect with the carbon fibers in the structural layers 25, 26, the laminate may include an insulative layer. The insulative layer 28 is disposed between the heating layer 30 and the structural layers. In particular, the laminate may include a first insulation layer 28 between the upper face of the heating layer 30 and the upper structural layer 25 and a second insulation layer 28 between the lower face of the heating layer and the lower structural layer 26. The insulation layer 28 provides electrical insulation between the structural layers and the electrically conductive elements (e.g. resistive elements 40, input electrode 50, output electrode 52) of the heating layer 30.

The insulation layer 28 may comprise any of a variety of electrically insulative materials. Preferably, the insulation layer 28 comprises a thermoplastic material. In the present instance, the insulation layer comprises one or more lamina of glass reinforced thermoplastic.

As discussed above, each of the structural layers 25, 26, the heating layer 30 and the insulative layers 28 may comprise layers of reinforced thermoplastic composite materials. Accordingly, the upper structural layer 25, the lower structural layers, the heating layer and any insulation layer can be integrally connected by fusing the layers. Specifically, the layers may be consolidated by applying sufficient heat to raise the layers above the melting point of the thermoplastic matrix and applying sufficient pressure to fuse the layers together. In this way, the heating layer 30 is embedded within the laminate between the upper and lower structural layers 25, 26.

It should be noted that the thickness of the layers in the Figures are not to scale and in some instances the thickness is exaggerated for illustration purposes only. For instance, in FIG. 1, the heating layer 30 is depicted as having a thickness greater than the insulation layers 28. However, the heating layer 30 may be just a single lamina of composite material. Similarly, the insulation layer may be a single lamina of composite material. Further still, as noted above, each insulation layer 28 may comprises one or more lamina. Additionally, the thickness of the structural layers may be significantly thicker than the thickness of the thickness of the heating layer. For instance, the upper layer 25 may be formed from three or more laminae of reinforced composite material so that the structural layers are substantially thicker than the thickness of the heating layer. Additionally, as shown in FIG. 2, the heating layer 30 is not necessarily a continuous layer extending the entire length and width of the laminate as shown in FIG. 1. Instead, the heating layer 30 may be embedded within the insulation layers 28.

Referring now to FIG. 3, the heated laminate 20 described above may be incorporated into a system for providing controlled heating. The system incorporates a power source 60 that is connected to heated laminate 20 via a controller 70. The controller may be any of a variety of electronic controllers, including but not limited to a P, PD, PI, PID controller or a microprocessor. The electrodes 50, 52 of the heated laminate are connected with the controller 70 so that the controller controls the flow of electricity to the laminate. In response to signals, the controller 70 closes the circuit between the heating assembly 30 and the power source to turn the heating layer ON. Similarly, in response to signals, the controller may disconnect the heating layers from the power source to turn the heating layer OFF. Similarly, the controller may be configured to increase or decrease a characteristic of the electricity, such as by increasing or decreasing the current provided to the heating layer.

The controller may control the flow of electricity to the heating assembly based on a variety of controls. For instance, the system may include a manually operable switch so that the controller controls the system in response to actuation of the switch (i.e. the heating layer 30 is connected with the power source when the switch is ON and disconnected when the switch is OFF). Additionally, the system 10 may include a feedback loop so that the controller controls the system in response to the feedback. For instance, the system may include a sensor that is used to detect a characteristic of the assembly and the controller may control the operation of the heating layer in response to the detected characteristic. An exemplary sensor is a sensor for detecting a characteristic indicative of the formation of ice on the laminate 20. For instance, the system may include an ice detector such as an optical transducer probe configured to detect the presence of ice on the laminate, such as the upper surface 22. The ice detector is connected to the controller to provide signals to the controller indicative of the presence of ice. If the signal indicates the presence of ice, the controller may connect the heating layer 30 with the power source to turn the heating layer ON. Similarly, if the controller receives a signal from the sensor 75 indicating a lack of ice, the controller may disconnect the heating layer from the power source to turn the heating layer OFF.

Configured as described above, the system may be configured to raise the temperature of one or more surfaces of the aerostructure to impede the formation of ice on the aerostructure or to melt ice formed on the aerostructure. Specifically, the first electrode and the electrically conductive carbon fibers are connected such that electric power applied to the first electrode is conducted to the electrically conductive carbon fibers to provide resistive heating sufficient for the heating layer to achieve a temperature increase of at least 50 degrees Fahrenheit or approximately 30 degrees Celsius. Optionally, the carbon fibers of the heater layer are connected with the first electrode such that electric power applied to the first electrode is conducted to the electrically conductive carbon fibers to provide resistive heating sufficient for the heating layer to achieve a temperature increase of 100 degrees Fahrenheit or approximately 55 degrees Celsius. Further still, the carbon fibers of the heater layer may be connected with the first electrode such that electric power applied to the first electrode is conducted to the electrically conductive carbon fibers to provide resistive heating sufficient for the heating layer to achieve a temperature increase of 200 degrees Fahrenheit or approximately 110 degrees Celsius.

The heated laminate 20 may be formed using a variety of processes. The details of a process of forming the heated laminate from a plurality of reinforced thermoplastic layers will now be described.

A plurality of layers of carbon fiber reinforced thermoplastic tape are laid over top of one another to form a plurality of plies that form the lower structural layer 26. The fiber orientation in the plies are varied. For example, the bottom layer may be formed of four plies oriented at 0, +45°, 90°, −45°. One or more layers of fiberglass reinforced thermoplastic are then laid over the bottom four layers. Two electrodes in the form of elongated electrically conductive metal strips such asof metal mesh are spaced apart from one another and arranged on the fiberglass layers running from a first end toward a second end. The carbon fiber reinforced thermoplastic tape forming the resistive elements 30 are then overlaid on the fiberglass layers so that one end of the carbon fiber tape overlies the first length of copper mesh and the second end of the carbon fiber tape overlies the second length of copper mesh. Additionally, the carbon fiber tape may be spliced to form a serpentine pattern, with metal mesh overlying the joints between adjacent pieces of the carbon fiber tape to form a continuous electrical path. After the heating elements are arranged over the lower fiberglass layers and the copper mesh, two layers of fiberglass reinforced thermoplastic are laid over the heating elements. Four layers of carbon fiber tape similar to the bottom four layers are then laid over the fiberglass layers. The top layers of carbon fiber thermoplastic tape form the upper structural layer. Like the lower structural layer, the orientation of the fibers in the plies of the upper structural layer is varied. For instance, the plies of the upper structural layer may be formed of four plies oriented at 0, +45°, 90°, −45°. In this exemplary laminate, the carbon fiber layers of the upper structural layer, the heating layer and the lower structural layer are formed of PEEK/AS4 carbon fiber reinforced unidirectional tape and the insulation layers are formed of PEEK/S2 fiberglass reinforced thermoplastic unidirectional tape.

The laminate is then consolidated by heating the assembled plies under pressure. For instance, the assembly may be heated up to a temperature above the melting temperature. The pressure is then removed and the consolidated laminate is cooled to ambient temperature.

A laminate formed according to such process was then connected with a power source. In particular, a 28 VDC 8 amp power source was connected with the laminate. Upon application of power to the laminate, the heating element provided sufficient resistance to provide a voltage drop of 25 V between the input electrode and the output electrode. The resulting resistance heating provided a temperature increase of 230° Fahrenheit. This temperature increase was below the glass transition temperature of the matrix material in the laminate and substantially below the melting temperature.

In the foregoing description, the laminate is described as a flat panel laminate. However, it should be understood that the invention is not limited to flat panel structures. For instance, the heated laminate may be used in a variety of structures in a variety of fields and may have particular application in the field of aerospace to provide ice protection systems for a variety of components, including, but not limited to airframes, nacelles and airfoils, such as wings, elevators etc. The laminate 20 described above may be formed into a curved structure and incorporated into a system similar to system 10 described above to provide a heated laminate structure.

Figure 4:
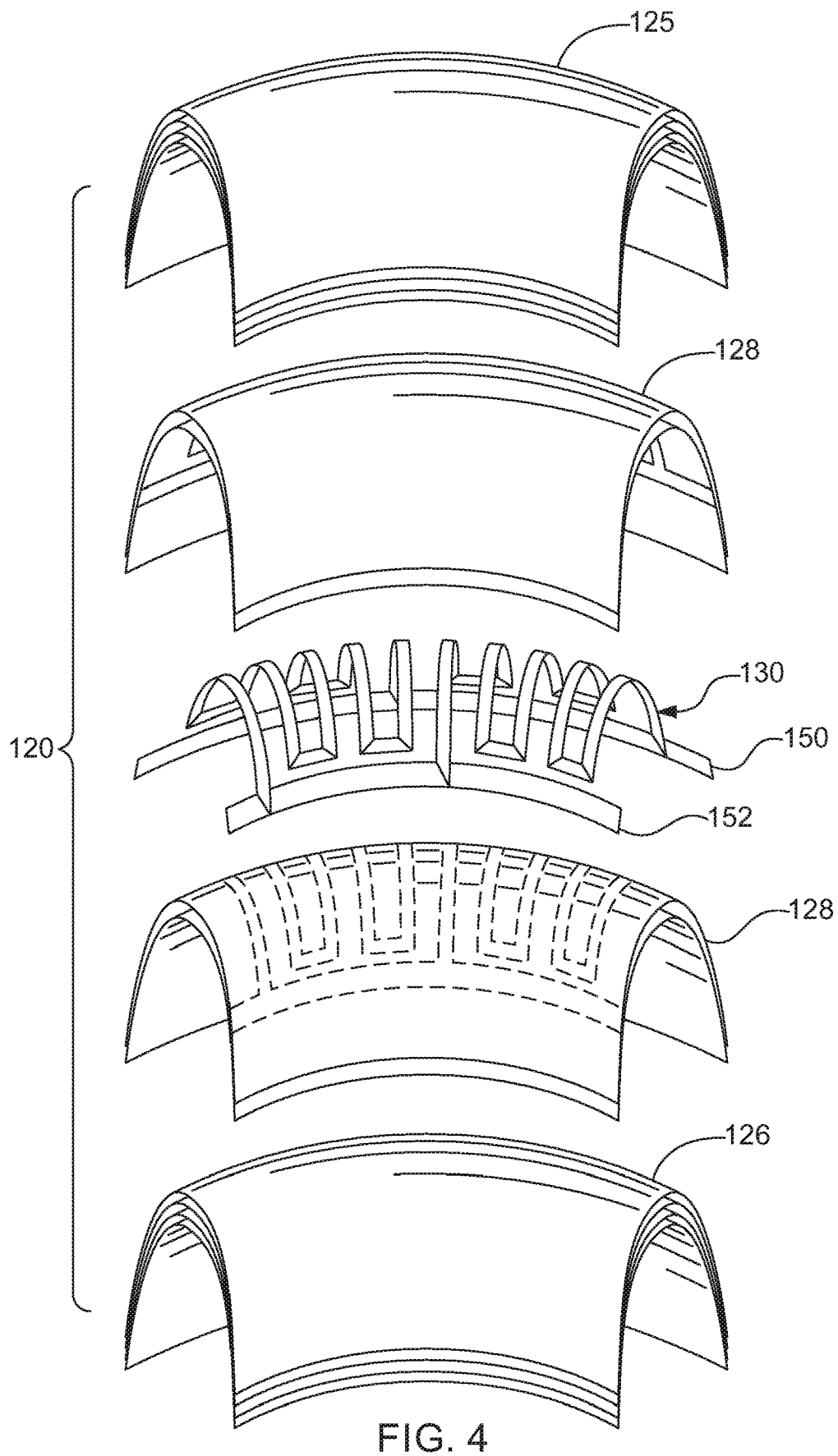
FIG. 4 is a partially broken away perspective view of a composite aerostructure incorporating an integrated heating assembly.
Figure 5:
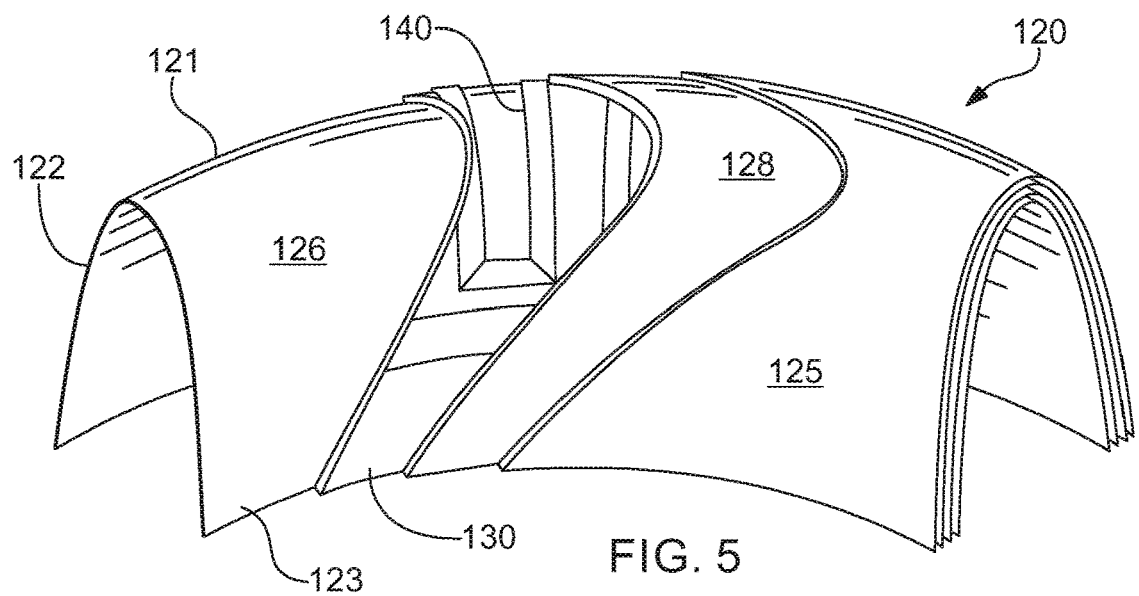
FIG. 5 is an exploded perspective view of the composite aerostructure illustrated in FIG. 4.
Figure 6:
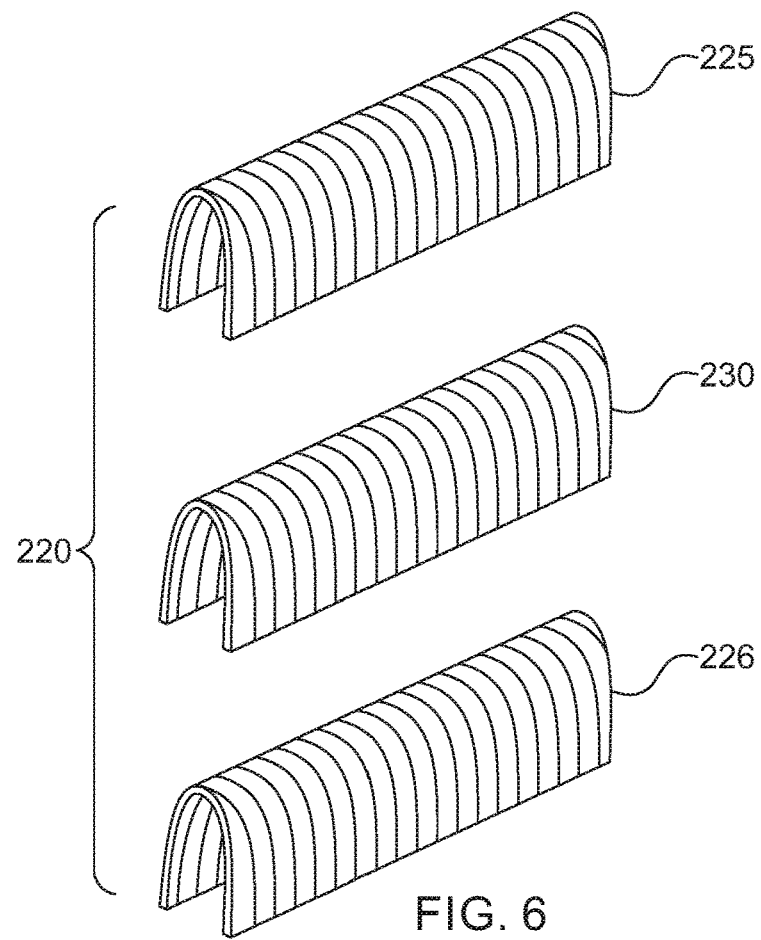
FIG. 6 is an exploded perspective view of an alternate composite aerostructure incorporating an integrated heating assembly.

For example, an exemplary laminate 120 forming an aerostructure is illustrated in FIGS. 4-5. Except as described further below, the characteristics of the laminate 120 are similar to the characteristics of the laminate 20 described above. The illustrated laminate 120 forms a section of the nacelle that forms a leading edge around the intake of the jet engine. The laminate 120 is formed so that the heating layer 130 wraps over the leading edge of the structure. In particular, the laminate comprises a convex curve having an apex 121, an upper surface 122 and a lower surface 123.

The laminate 120 is formed similar to the laminate 20 described above. In particular, the laminate includes an upper structural layer 125 formed of a plurality of reinforced composite laminae and a lower structural layer 126 formed of a plurality of reinforced composite laminae. A heating layer 130 is embedded between the upper and lower structural layers 125, 126. Additionally, an upper electrically insulative layer 128 may be disposed between the heating layer and the upper structural layers and a lower insulative layer may be disposed between the heating layer and the lower structural layers. The heating layer comprises a plurality of resistive elements forming an electrical path between an input electrode 150 and an output electrode 152. The heating layer may be any of a variety of elements, and in the present instance, the heating element is formed of a non-metal conductive element, such as carbon fiber.

The heating layer may be configured to overlie either the upper or lower surfaces of the laminate, however, in the present instance, the heating layer is configured to overlap both the upper and lower surfaces. More specifically, the heating layer 130 is arranged within the lamina so that a portion of the resistive element 140 overlies the upper surface. Additionally, the resistive element is arranged so that a portion of the resistive element extends over the apex 121 of the curve and then over the lower surface 123. In this way, the heating element wraps around the leading edge of the nacelle.

The layers of the nacelle are consolidated to form an integral laminate with the heating layer embedded within the laminate. For instance, the laminate 120 may be formed of reinforced thermoplastic composite materials as described above so that the laminate is consolidated by heating the assembled layers to an elevated temperature under pressure.

As described above, the system illustrated in FIG. 3 may incorporate the composite element 120 illustrated in FIGS. 4-5 instead of the composite element 20 illustrated in FIG. 3. Similarly, FIGS. 6-9 illustrate an alternate composite element 220 that can be incorporated into the system illustrated in FIG. 3 instead of composite element 20. Accordingly, the details of composite element 220 will now be described in detail.

The composite element 220 may include an upper structural layer 225, a lower structural element 226 and a heating layer 230 disposed between the upper structural layer 225 and the lower structural layer. The structure of the upper and lower structural layers 225, 226 may vary. In particular, the structural layers 225, 226 may be formed of one or more layers of reinforced composite material, such as carbon fiber or fiberglass reinforced material. In the present instance the structural layers 225, 226 are formed of the same material. For example, in the present instance, a plurality of layers of carbon fiber reinforced thermoplastic tape are laid over top of one another to form a plurality of plies that form the lower structural layer 226. The fiber orientation in the plies are varied. For example, the bottom layer may be formed of four plies of carbon fiber reinforced thermoplastic oriented at 0, +45°, 90°, −45°. The upper structural layer 225 may be formed similar to the lower layer 226. The heating layer 240 comprises one or more resistive elements 240 formed of carbon fiber reinforced thermoplastic. Preferably, the resistive element(s) are formed of carbon fiber reinforced thermoplastic material that is substantially similar to the material from which the structural layers 225, 226 are formed.

The heating layer 230 is comprised of a plurality of resistive elements. As described previously, the heating layer may be formed of a single resistive element 40, 140. Alternatively, the heating layer 230 may include a plurality of heating zones that can be independently controlled. For instance, in the embodiment illustrated in FIGS. 6-9, the heating layer 230 includes three heating zones 250, 270 and 290. As described further below, the heating layer 240 comprises a plurality of layers and the three heating zones are spread across two different layers in the heating layer. However, it should be appreciated that the heating layer may be a single layer or may be more than two layers.

Figure 7:
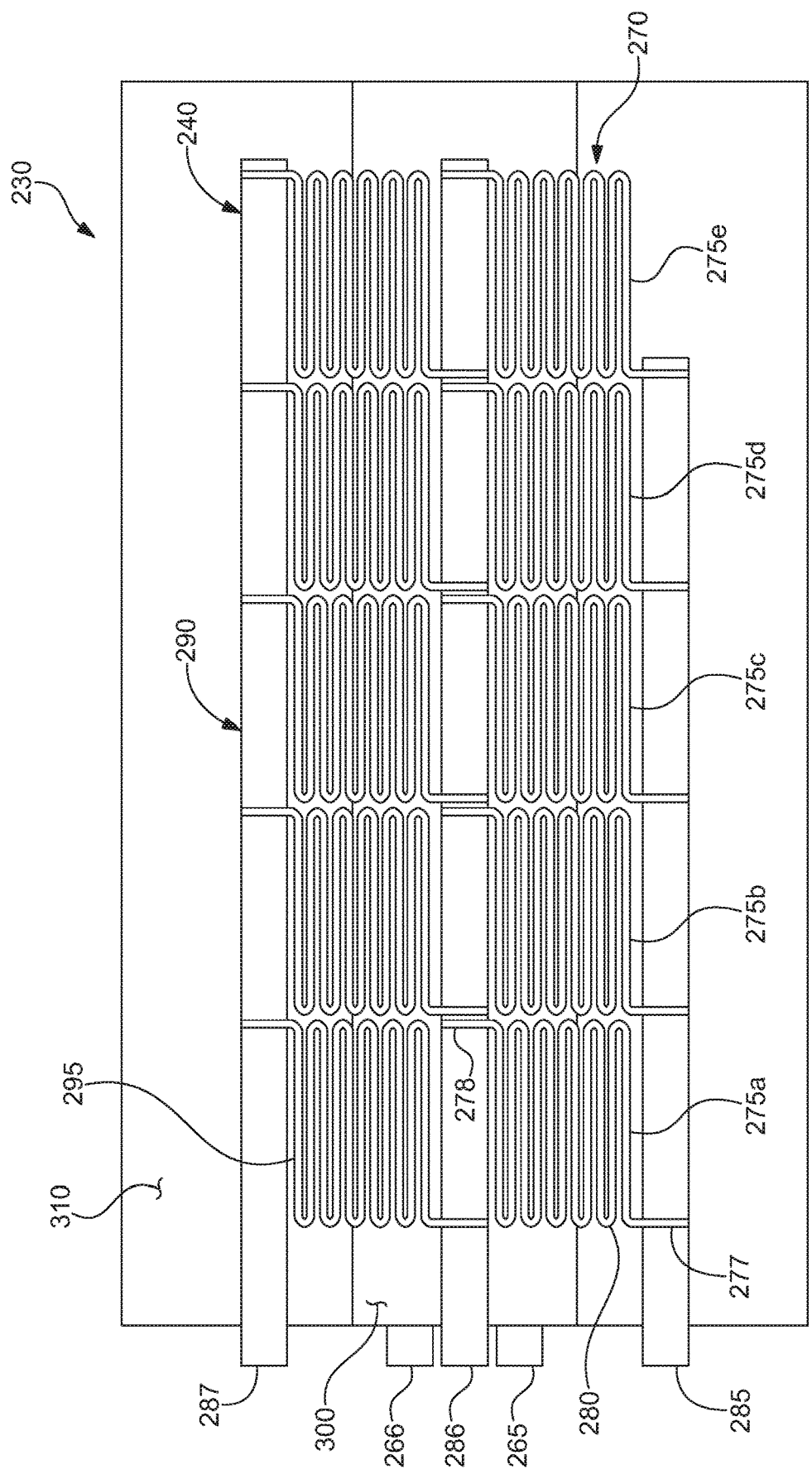
FIG. 7 is a plan view of a heating layer of the aerostructure illustrated in FIG. 6.
Figure 8:
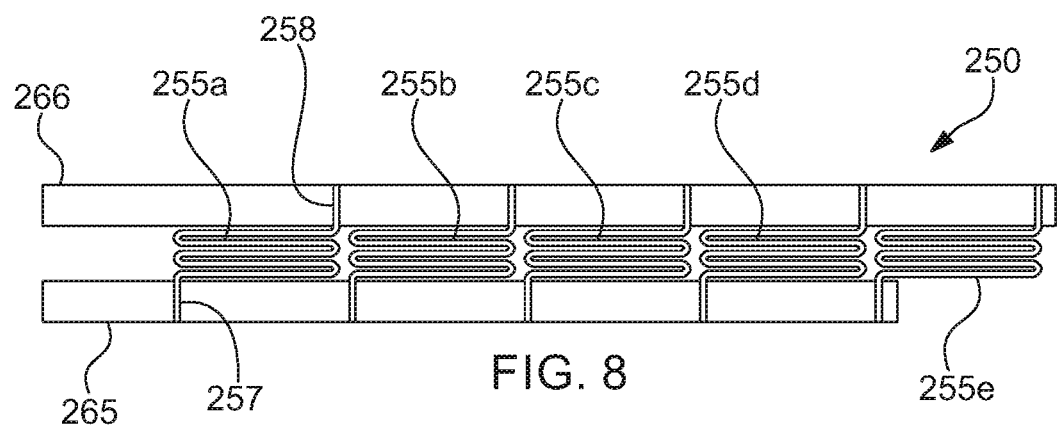
FIG. 8 is a plan view of a heating zone of the heating layer illustrated in FIG. 7.
Figure 9:
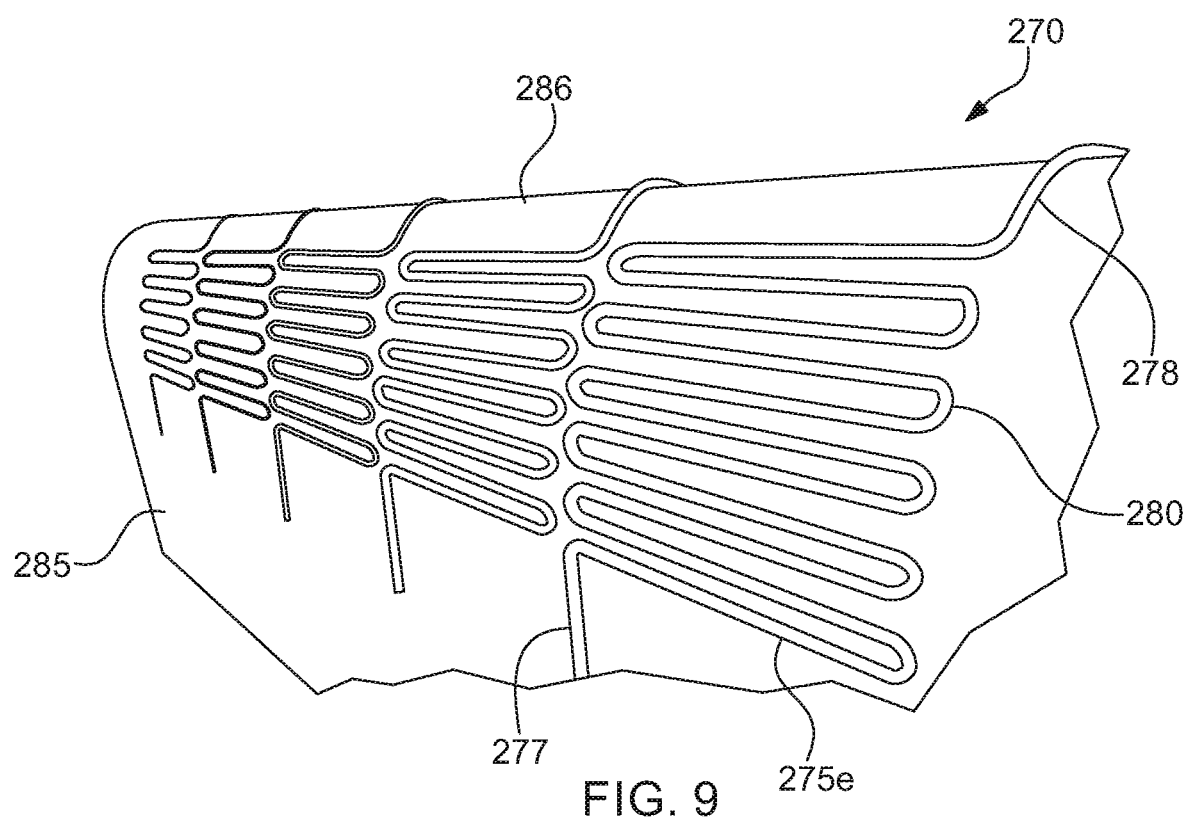
FIG. 9 is a perspective view of a portion of the heating layer illustrated in FIG. 7.

Referring now to FIG. 7-8 details of the heating layer will now be described in greater detail. FIG. 8 illustrates the details of the first zone 250 of the heating element most clearly. The first zone includes one or more resistive elements 255 extending between a plurality of conductive elements 265, 266. The number of resistive elements 255 may vary, however, in the present instance, the first zone 250 includes five resistive elements designated 255A-255E. The resistive elements may have different configurations, however in the present instance, each resistive element 255A-255E is substantially similar having a substantially similar resistive value. Accordingly, the following description of resistive element 255 applies to each of resistive elements 255A-255E.

Resistive element 255 comprises three sections: a lead 257 at a first end, a tail 258 at a second end, and a body section 260 extending between the lead and the tail. The lead 257 forms an electrical connection with conductive element 265 and the tail forms an electrical connection with conductive element 266. The body provides an electrical pathway between the lead and the tail. In particular, the body 260 provides an electrical pathway having sufficient resistance to provide joules effect heating sufficient to raise the temperature of the heating layer 230 when current is passed through the body.

The resistive elements 255 may be configured in any of a variety of configurations. For instance, the body 260 may be a generally straight or linear body extending between the first conductor 265 and the second conductor 266. In this way, zone one may comprises a plurality of straight resistive elements extending between the first conductor 265 and the second conductor 266. However, in the present instance, the body 260 of resistive element 255 comprises a convoluted pathway to increase the effective heating area of each heating element. Specifically, the body 260 may comprise a serpentine configuration having a plurality of legs. In particular, the serpentine path may include a plurality of generally or substantially parallel legs. The serpentine path preferably is constrained within a single layer or lamina so that the serpentine path of the body does not cross or overlap itself at any point between the lead 257 and the tail 258. In other words, the body 260 may have a nominal thickness that is substantially constant along the length of the body. Additionally, the body may form a convoluted reciprocal path, but the body does not cross over itself forming a point or area in which the resistive element has a thickness that is twice the nominal thickness of the body.

Preferably, the resistive elements 255 are connected in parallel between the first and second conductive elements 265, 266. In this way, the first zone 250 of the heating element 230 comprises a first circuit in which the conductor 265 forms a first lead or electrode and the second conductor 266 forms a second lead or electrode with the resistive elements electrically connecting the two electrodes. When the two electrodes 265, 266 are connected to a power supply current passes through the resistive elements 255 to create joules effect heating. In the embodiment illustrate in FIG. 8, the resistive element is a continuous electrical pathway between the two conductive elements 265, 266. In particular, the resistive elements comprise a plurality of continuous unidirection carbon fibers forming a convoluted electrical path, such as a serpentine path, between the first electrode 265 and the second electrode 266. In the present instance, the carbon fibers are embedded within a matrix of thermoplastic material. More specifically, preferably the carbon fibers are embedded within a thermoplastic resin that is substantially the same as the thermoplastic material forming the matrix material of the structural layers. For instance, the resistive element may be formed of a narrow unidirectional tape, such as 0.12" wide AS4D/PAEK unidirectional prepreg tape. An exemplary unidirectional carbon fiber tape is TC1225 sold by Tencate as referenced previously.

In particular, preferably the resistive element 255 comprises a unidirectional material such that substantially all of the carbon fibers in the material are parallel. More specifically, preferably substantially all of the carbon fibers have a first end and a second end so that substantially all of the carbon fibers extend the entire length of the resistive element 255 from the lead 257 to the tail 258. In this context, substantially all of the carbon fibers means at least 90% of the carbon fibers in the resistive element.

The resistive element 255 may be formed into a convoluted shape by heat forming the unidirectional fiber tape. Specifically, a length of unidirectional tape may be heated to a sufficient temperature to cause the thermoplastic material to soften. For example, the tape may be heated to a temperature above the glass transition temperature Tg for the thermoplastic matrix material for the tape. Further still, it may be desirable to heat the tape to a temperature significantly higher than the glass transition temperature, such as at or above the melting temperature Tm for the thermoplastic matrix material (if the thermoplastic has a melt temperature). In the example of a PAEK or PEEK thermoplastic resin, the tape may be heated to above approximately 300° C. Once the tape is heated above Tm, the tape is wrapped around a form that provides a convoluted shape. Formed in this way, the resistive element forms a convolute path in which the resistive element does not cross over itself so that the entire length of the resistive element is substantially the same as a single thickness of the tape. After the tape is formed to the convoluted shape, the tape is cooled to below the glass transition.

As described above, the resistive element 255 provides an electrical path. Because the carbon fibers are unidirectional, the electrical path follows the configuration of the resistive element from the first electrode 265 to the second electrode 266. For instance, as shown in FIG. 8, each resistive element follows a convoluted path, such as a serpentine path. The resistive element 255 has a central axis that extends from the lead 257 to the tail, following the serpentine path. The carbon fibers in the resistive element follow the central axis. In other words, all or substantially all of the carbon fibers in the resistive element are substantially parallel to one another and substantially parallel to the central axis.

The resistive element 255 is connected with the conductive elements 265, 266 so that the carbon fibers of the resistive element are electrically connected with the conductive elements. More specifically, the conductive elements directly contact the carbon of the carbon fibers. In particular, it should be noted that the carbon fibers may have a coating, referred to as sizing. Preferably, the conductive elements 265, 266 directly contact the carbon fiber so that the carbon fiber provides the electrical path between the conductive elements 265, 266. More specifically, if the carbon fibers include a sizing (such as a coating to promote promoting bonding between the carbon fibers and the thermoplastic resin) the sizing may be significantly less conductive that the carbon fiber so that the carbon fiber conducts at least the majority and preferably substantially all of the electricity flowing through the resistive element between the first conductor and the second conductor.

Configured as describe above, in an exemplary configuration of the first zone 250, each resistive element 255A-255E provides approximately 46 ohms of resistance. In this way, the nominal wattage of the first zone at 100 volts AC is approximately 1100 watts. Accordingly, the heating element 230 provides sufficient joules effect heating to raise the surface temperature of the outer surface of upper structural element 225 without raising the temperature of the element 220 above the glass transition temperature for the thermoplastic matrix material in the element.

Referring now to FIG. 7, the details of the second and third heating zones 270, 290 will now be described. The second heating zone 270 is configured substantially similarly to the first heating zone 250. Specifically, the second heating zone 270 comprises a plurality of resistive elements 275A-275E. Each of the resistive elements 275 includes a lead 277 electrically connected with a third conductive element 285 and a tail electrically connected with a fourth conductive element 286. The resistive elements 275A-275E are connected in parallel with the two conductive elements 285, 286.

The resistive elements 275A-275E may be formed substantially identically with the resistive elements 255A-255E of the first heating zone 250. However, it may be desirable to vary the configuration of the resistive elements in the second heating zone to vary the heating characteristics of the second heating zone. For instance, in the present instance resistive elements 275 are substantially longer than resistive elements 255. In particular, the body 280 of resistive element 275 may be approximately twice as long as the body 260 of resistive element 255. In this way, if resistive element 275 is formed of the same material as resistive element 255 then resistive element 275 will have substantially higher resistance than resistive element 255. In this way, at the same voltage, the nominal wattage of the second zone is significantly less than the nominal wattage of the first zone 250. For example, at 100 volts AC the wattage of the second heating zone may be approximately 800 watts as opposed to nominally 1100 watts for the first heating zone.

FIG. 7 further illustrates the third heating zone 290, which includes a plurality of resistive elements 295A-295E connected in parallel to the fourth conductive element 286 and a fifth conductive element 287. Although the resistive elements 295A-295E may be configured differently from resistive elements 275A-275E, in the present instance resistive elements 295A-295E are substantially identical to resistive elements 275A-275E.

As shown in FIG. 7, the first heating zone 250 is on a separate layer than the second and third heating zones 270 290. In particular, the three heating zones are configured so that the body 260 of each resistive element 255A-255E is positioned below the second and third heating zones so that the body of each resistive element 275, 295 does not overlie the body 260 of each resistive element in the first heating zone. In this way, the heating area provided by the second and third heating zones does not substantially overlap the heating area created by the first heating zone.

As shown in FIG. 7, the different layers of the heating element are separated by insulative layers. For instance, one or more insulative layers may be positioned between the layer having the first heating zone 250 and the layers having the second and third heating zones. In particular, an insulative layer formed of fiberglass reinforced thermoplastic material may overlie the first heating zone to electrically isolate the first resistive elements 255 from the second and third resistive elements 275, 295. The insulative layers may be formed of S2 PEEK layers as described above.

The laminate 220 is consolidated by heating the assembled plies 225, 226, 230 under pressure. For instance, the assembly may be heated up to a temperature above the melting temperature. The pressure is then removed and the consolidated laminate is cooled to ambient temperature.

A laminate formed according to such process can then be connected with a power source to create a circuit similar to the circuit shown in FIG. 3. However, since the laminate 220 in FIGS. 6-9 includes three heating zones, the circuit may include one or more switches to control the power supplied to each of the three heating zones. The switches allow power to be supplied independently to one or more of the three heating zones 250, 270, 290. For example, when the laminate illustrated in FIGS. 6-9 is formed into an aerostructure, the different heating zones may be positioned and configured to apply heat to different parts of the aerostructure. In the instance of an airfoil, the airfoil may have a leading edge, an upper surface and a lower surface. The three heating zones may be positioned so that the first heating zone 250 overlies the leading edge of the airfoil, the second heating zone may overlie the upper surface and the third heating zone overlies the lower surface of the airfoil. In such a configuration, the resistive elements of the three heating zones 250, 270, 290 are configured to provide sufficient heating to raise the temperature of one or more surfaces of the laminate by at least 50 degrees Fahrenheit or approximately 30 degrees Celsius. For example, the first heating zone may be configured an oriented to raise the temperature of the outer surface of the leading edge by at least approximately 50 degree Fahrenheit or approximately 30 degrees Celsius. Similarly, the second zone 270 may heat the upper surface and the third zone may heat the lower surface.

The system may also include a plurality of sensors. For instance, the system may include a first sensor sensing a characteristic of a first area, a second sensor sensing a characteristic of a second area and a third sensor sensing a characteristic of a third area. Based on the signals received from the three sensors, the system may independently control the power supplied to each of the three heating zones. In one example, the first sensor detects the presence of ice on the leading edge and the system controls the power supplied to the first heating zone in response to the signal from the first sensor. In particular, if the first sensor detects a characteristic indicative of the presence of ice the system may increase the power supplied to the first heating zone 250 to increase the temperature of the leading edge. Additionally, the system may control the power supplied to the first heating zone by reducing or discontinuing the power supplied to the first heating zone if the first sensor detects a characteristic indicative of a lack of ice on the leading edge. In this way, the system may control the heating of the first zone to increase or decrease the temperature of the leading edge to impede the formation of ice or to melt ice already formed on the leading edge. Similarly, in response to signals received from the second sensor, the system may control the power supplied to the second heating zone to impede the formation of ice or to melt ice already formed on the upper surface. Further still, in response to signals received from the third sensor the system can control the power supplied to the third heating zone to impede the formation of ice or to melt ice already formed on the lower surface.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. A heated aerostructure, comprising:
a composite structure, comprising:
a carbon fiber reinforced thermoplastic upper structural layer;
a carbon fiber reinforced thermoplastic lower structural layer;
a reinforced thermoplastic heater layer, comprising:
a plurality of electrically conductive non-metallic fibers;
a first electrode electrically connected with the conductive non-metallic fibers; and
a second electrode electrically connected with the conductive non-metallic fibers, so that the conductive non-metallic fibers provide an electrical pathway between the first electrode and the second electrode;
a controller connected with a sensor and an electrical power source for controlling the power provided to the first electrode;
wherein the first electrode and the conductive non-metallic fibers are connected such that electric power applied to the first electrode is conducted to the electrically conductive non-metallic fibers to provide resistive heating sufficient to heat the composite structure to impede the formation of ice on the composite structure, and
wherein the plurality of electrically conductive fibers of the heater layer comprise unidirectional carbon fiber reinforced thermoplastic.

2. The heated aerostructure of claim 1 wherein the electrically conductive fibers have a first end electrically connected with the first electrode and a second end electrically connected with the second electrode and substantially all of the carbon fibers extend continuously from the first end to the second end.

3. The heated aerostructure of claim 1 wherein the controller is operable to control the electrical power provided to the first electrode in response to signals received from the sensor.

4. The heated aerostructure of claim 3 wherein the electrically conductive fibers have a first end electrically connected with the first electrode and a second end electrically connected with the second electrode and substantially all of the carbon fibers extend continuously from the first end to the second end.

5. The heated aerostructure of claim 4 wherein the heater layer comprises a convoluted path between the first and second electrodes.

6. The heated aerostructure of claim 4 comprising a second heater layer independently operable from the heater layer and a third electrically insulative layer insulating the second heater layer from the heater layer.

7. The heated aerostructure of claim 1 wherein the thermoplastic of each of the heater layer, the upper layer and the lower layer are fused with the thermoplastic in adjacent layers.

8. A heated aerostructure, comprising:
a carbon fiber reinforced thermoplastic upper layer;
a carbon fiber reinforced thermoplastic lower layer;
a carbon fiber reinforced thermoplastic heater layer, wherein the upper layer, lower layer and heater layer are consolidated to form a laminate;
wherein the heater layer comprises a plurality of electrically conductive carbon fibers and wherein the heater layer is configured so that the electrically conductive carbon fibers of the heater layer are connectable with a power source so that electricity can flow through the electrically conductive carbon fibers of the heater layer to provide resistive heating sufficient for the heating layer to heat at least a portion of the laminate at least 50 degrees Fahrenheit, and wherein the electrically conductive carbon fibers form a unidirectional carbon fiber reinforced thermoplastic layer.

9. The heated aerostructure of claim 8 wherein the electrically conductive carbon fibers have a first end electrically connected with a first electrode and a second end electrically connected with a second electrode and substantially all of the carbon fibers extend continuously from the first end to the second end.

10. The heated aerostructure of claim 9 wherein the heater layer comprises a convoluted path between the first and second electrodes.

11. The heated aerostructure of claim 9 comprising a sensor operable to sense a characteristic indicative of the presence of ice on the upper layer.

12. The heated aerostructure of claim 10 comprising a controller connected with the sensor and an electrical power source for controlling the power provided to the heater layer.

13. The heated aerostructure of claim 11 wherein the controller is operable to control the electrical power provided to heater layer in response to signals received from the sensor.

* * * * *